US010382704B2

(12) United States Patent
Kawamura et al.

(10) Patent No.: US 10,382,704 B2
(45) Date of Patent: Aug. 13, 2019

(54) IMAGE PROCESSING DEVICE THAT GENERATES A COMPOSITE IMAGE

(71) Applicant: CASIO COMPUTER CO., LTD., Shibuya-ku, Tokyo (JP)

(72) Inventors: Yoshihiro Kawamura, Tokyo (JP); Kouichi Nakagome, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 156 days.

(21) Appl. No.: 15/335,474

(22) Filed: Oct. 27, 2016

(65) Prior Publication Data
US 2017/0048466 A1 Feb. 16, 2017

Related U.S. Application Data

(62) Division of application No. 13/846,812, filed on Mar. 18, 2013, now abandoned.

(30) Foreign Application Priority Data

Mar. 21, 2012 (JP) .................................. 2012-064529

(51) Int. Cl.
*G06K 9/00* (2006.01)
*G06K 9/60* (2006.01)
(Continued)

(52) U.S. Cl.
CPC ....... *H04N 5/2625* (2013.01); *G06K 9/00342* (2013.01); *G06K 9/60* (2013.01);
(Continued)

(58) Field of Classification Search
CPC .. H04N 5/2625; H04N 5/2621; G06T 3/4038; G06T 2200/32; G06K 9/00342; G06K 9/60
See application file for complete search history.

(56) References Cited

U.S. PATENT DOCUMENTS 8,696,482 B1 * 4/2014 Pedenko ............ A63B 24/0003
473/221
2002/0115047 A1 * 8/2002 McNitt .............. A63B 24/0003
434/252
(Continued)

FOREIGN PATENT DOCUMENTS

CN  102075680 A  5/2011
JP  04130882 A  5/1992
(Continued)

OTHER PUBLICATIONS

Gehrig, Nicolas, Vincent Lepetit, and Pascal Fua. "Visual Golf Club Tracking for Enhanced Swing Analysis." BMVC. 2003.*
(Continued)

*Primary Examiner* — Menatoallah Youssef
(74) *Attorney, Agent, or Firm* — Holtz, Holtz & Volek PC

(57) ABSTRACT

An image processing device having a CPU which functions as units including an image acquiring unit that acquires a plurality of images indicative of a sequence of actions of a subject; a selecting unit that selects, in accordance with an operation by a user, one of a partial action from among a plurality of kinds of partial actions included in the sequence of actions of the subject; an image selecting unit that selects a plurality of images corresponding to the specific kind of partial action selected by the selecting unit from among the plurality of images acquired by the image acquiring unit; and an image composition unit that generates a composite image wherein the composite image includes the plurality of images.

11 Claims, 6 Drawing Sheets

(51) Int. Cl.
*G06T 3/40* (2006.01)
*H04N 5/262* (2006.01)

(52) U.S. Cl.
CPC ......... *G06T 3/4038* (2013.01); *H04N 5/2621* (2013.01); *G06T 2200/32* (2013.01)

(56) References Cited

U.S. PATENT DOCUMENTS

| | | | |
|---|---|---|---|
| 2004/0096085 A1 | | 5/2004 | Matsumoto et al. |
| 2009/0232416 A1 | | 9/2009 | Murashita et al. |
| 2011/0122275 A1 | | 5/2011 | Kawai et al. |
| 2012/0243802 A1* | | 9/2012 | Fintel ............... H04N 5/2625 382/284 |

FOREIGN PATENT DOCUMENTS

| | | | | |
|---|---|---|---|---|
| JP | 11098450 | A | | 4/1999 |
| JP | 2002027398 | A | | 1/2002 |
| JP | 2008104509 | A | | 5/2008 |
| JP | 2010192957 | | * | 2/2009 |
| JP | 2010192957 | | * | 9/2010 ............ H04N 5/232 |
| JP | 2010192957 | A | | 9/2010 |
| JP | 2011109557 | A | | 6/2011 |

OTHER PUBLICATIONS

Youssef (Youssef, Menatoallah "Hull Convexity Defect Features for Human Action Recognition." Electronic Thesis or Dissertation. University of Dayton, 2011. https://etd.ohiolink.edu/).*
Gehrig, Nicolas, Vincent Lepetit, and Pascal Fua. "Visual Golf Club Tracking for Enhanced Swing Analysis." BMVC. 2003. (Year: 2003).*
Youssef (Youssef, Menatoallah "Hull Convexity Defect Features for Human Action Recognition." Electronic Thesis or Dissertation. University of Dayton, 2011. https://etd.ohiolink.edu/) (Year: 2011).*
Chinese Office Action (and English translation thereof) dated Sep. 25, 2015, issued in counterpart Chinese Application No. 201310090849.8.
Japanese Office Action (and English translation thereof) dated Oct. 13, 2015, issued in counterpart Japanese Application No. 2012-064529.
Japanese Office Action dated Dec. 24, 2014, issued in counterpart Japanese Application No. 2012-064529.
Korean Office Action dated Feb. 5, 2014 (and English translation thereof) in counterpart Korean Application No. 10-2013-0030241.
Gehrig, et al., "Visual Golf Club Tracking for Enhanced Swing Analysis", BMVC. 2003.
Youssef, "Hull Convexity Defect Features for Human Action Recognition", Electronic Thesis or Dissertation, University of Dayton, 2011, https://etd.ohiolink.edu.

* cited by examiner

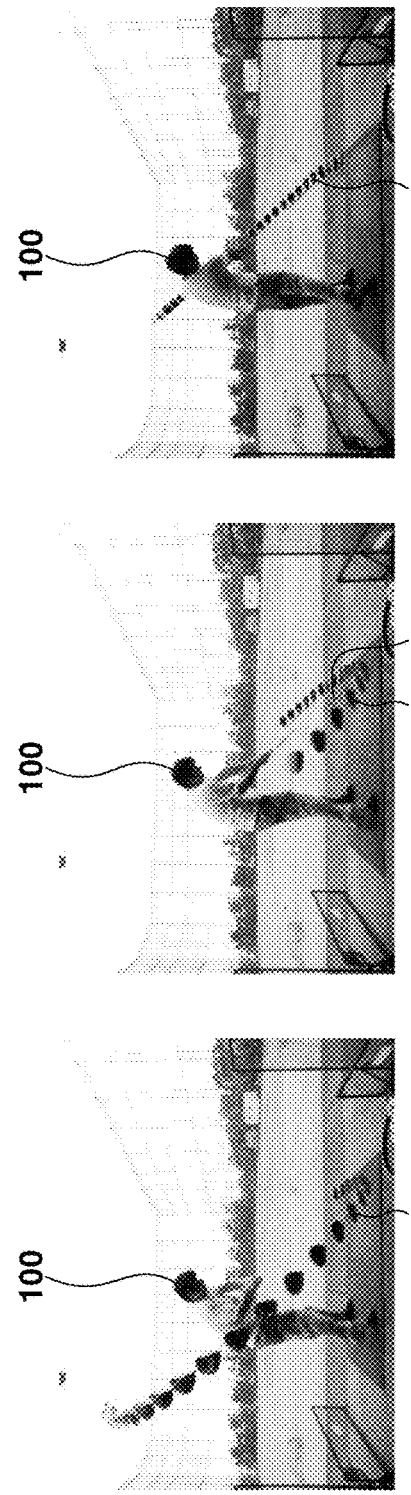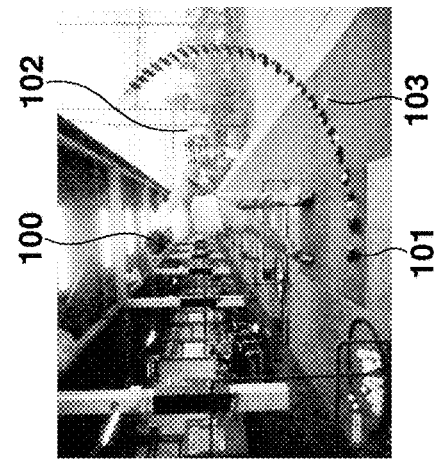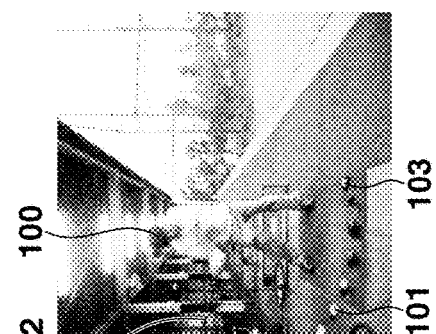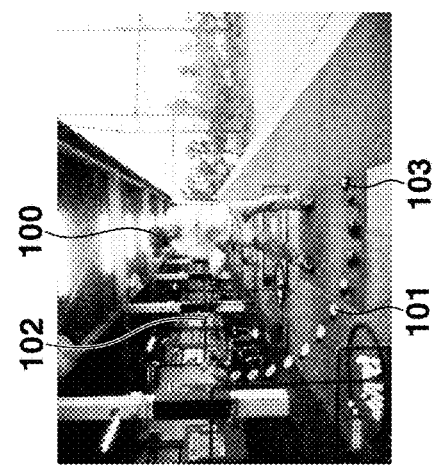

IMAGE PROCESSING DEVICE THAT GENERATES A COMPOSITE IMAGE

CROSS-REFERENCE TO RELATED APPLICATIONS

This application is a Divisional application of U.S. Ser. No. 13/846,812, filed on Mar. 18, 2013 based on and claiming the benefit of priority from Japanese Patent Application No. 2012-064529, filed on Mar. 21, 2012, the contents of both of which are incorporated herein by reference.

BACKGROUND OF THE INVENTION

Field of the Invention

The present invention relates to an image processing device that generates a composite image, an image processing method, and a storage medium.

Related Art

Conventionally, actions of an object captured in a moving image are photographed by an image capture device such as a digital camera and used for subsequent checking. For example, for sports such as golf, a swing action is recorded as a moving image and the data of the swing is used for subsequent checking.

The technology described in Japanese Unexamined Patent Application, Publication No. H11-98450 has been known as technology for such checking swing form. The technology disclosed in Japanese Unexamined Patent Application, Publication No. H11-98450 is technology for combining a sequence of swing actions of a golf club head into a single static image to display.

SUMMARY OF THE INVENTION

An image processing device according to one aspect of the present invention includes: an image acquiring unit that acquires a plurality of images indicative of a sequence of actions of an object; an image specifying unit that specifies a predetermined partial action in the sequence of the actions of the object from the plurality of images acquired by the image acquiring unit; an image selecting unit that selects a plurality of images corresponding to the predetermined partial action from among the plurality of images, based on a specifying result by the image specifying unit; and a composite image generating unit that generates a composite image from the plurality of images selected by the image selecting unit.

An image processing method according to one aspect of the present invention is an image processing method executed by an image processing device, and the method includes the steps of: acquiring a plurality of images indicative of a sequence of the actions of an object; specifying a predetermined partial action during the sequence of an action of the object from the plurality of images acquired by the image acquiring unit; selecting a plurality of images corresponding to the predetermined partial action from among the plurality of images, based on a specifying result by the image specifying unit; and generating a composite image from the plurality of images selected by the image selecting unit.

A storage medium encoded with a computer-readable program according to one aspect of the present invention enables a computer to execute functions as: an image acquiring unit that acquires a plurality of images indicative of a sequence of actions of an object; an image specifying unit that specifies a predetermined partial action during the sequence of an action of the object from the plurality of images acquired by the image acquiring unit; an image selecting unit that selects a plurality of images corresponding to the predetermined partial action from among the plurality of images, based on a specifying result by the image specifying unit; and a composite image generating unit that generates a composite image from the plurality of images selected by the image selecting unit.

BRIEF DESCRIPTION OF THE DRAWINGS

FIGS. 4A to 4F are a schematic view illustrating an example of a partial composite image;

DETAILED DESCRIPTION OF THE INVENTION

In the following, embodiments of the present invention are explained with reference to the drawings.

Figure 1:
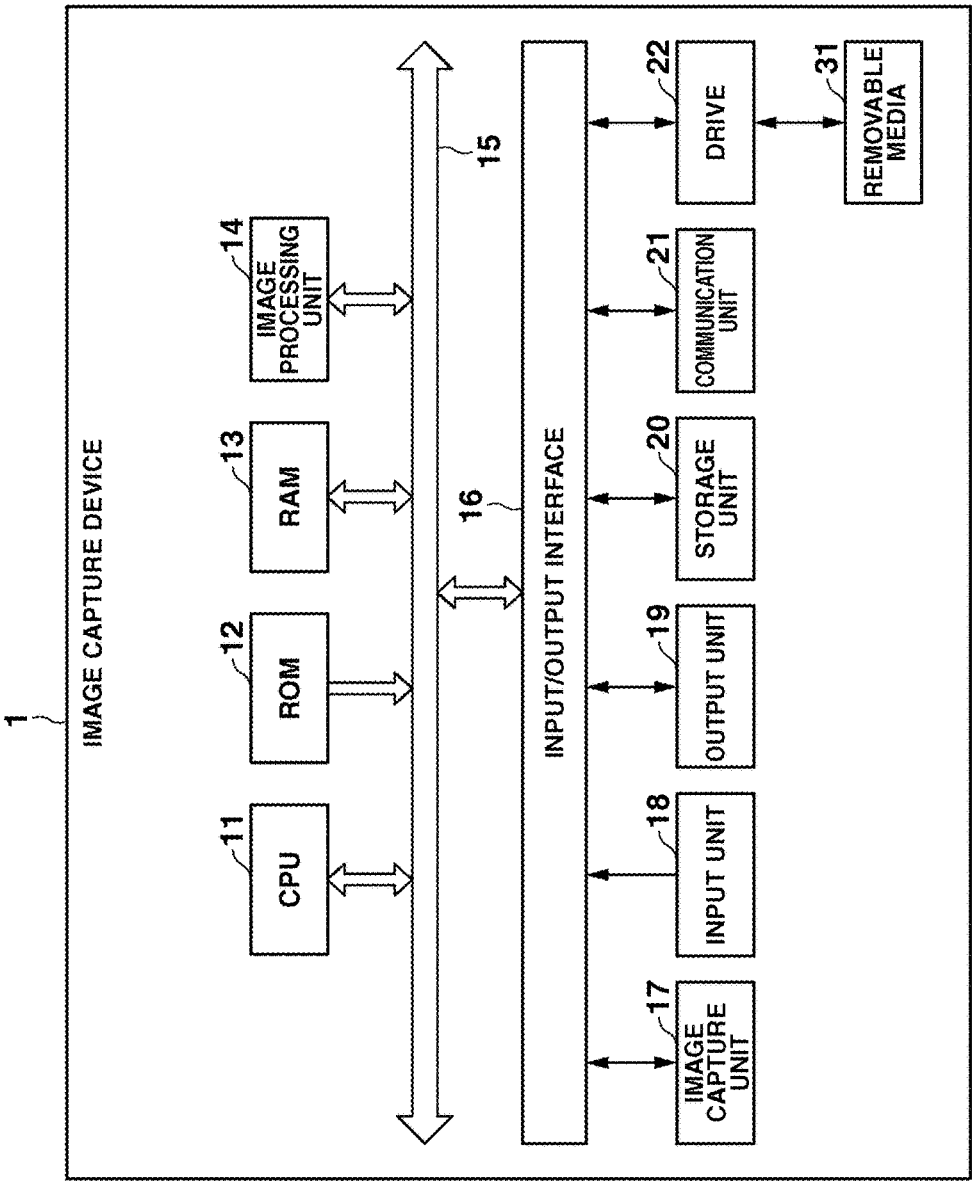
FIG. 1 is a block diagram illustrating a hardware configuration of an image capture device according to an embodiment of an image processing device of the present invention.

FIG. 1 is a block diagram illustrating a hardware configuration of an image capture device according to an embodiment of an image processing device of the present invention.

The image capture device 1 is configured as, for example, a digital camera.

The image capture device 1 includes a CPU (Central Processing Unit) 11, ROM (Read Only Memory) 12, RAM (Random Access Memory) 13, an image processing unit 14, a bus 15, an input/output interface 16, an image capture unit 17, an input unit 18, an output unit 19, a storage unit 20, a communication unit 21, and a drive 22.

The CPU 11 executes various processing in accordance with programs stored in the ROM 12, or programs loaded from the storage unit 20 into the RAM 13.

The RAM 13 stores the necessary data and the like upon the CPU 11 executing various processing, as appropriate.

The CPU 11, the ROM 12, and the RAM 13 are connected to each other via the bus 15. The input/output interface 16 is also connected to the bus 15. The image capture unit 17, the input unit 18, the output unit 19, the storage unit 20, the communication unit 21, and the drive 22 are also connected to the input/output interface 16.

The image capture unit 17 (not illustrated) includes an optical lens unit and an image sensor.

The optical lens unit is configured by a lens that condenses light in order to capture an image of a subject, e.g., a focus lens, zoom lens, etc.

The focus lens is a lens that causes a subject image to form on a light receiving surface of an image sensor. The zoom lens is a lens that causes the focal length to freely change in a certain range.

Peripheral circuits that adjust the setting of parameters such as focus, exposure, white balance, etc. are also provided to the optical lens unit as necessary.

The image sensor is configured from photoelectric conversion elements, AFE (Analog Front End), etc.

The photoelectric conversion elements are configured from CMOS (Complementary Metal Oxide Semiconductor)-type photoelectric conversion elements. A subject image is reflected from the optical lens unit in the photoelectric conversion elements. Therefore, the photoelectric conversion elements performs photoelectric conversion of a subject image (captures an image), accumulates image signals for a certain time period, and sequentially supplies the image signals thus accumulated to an AFE as analog signals.

The AFE conducts various signal processing such as A/D (Analog/Digital) conversion processing on these analog image signals. Digital signals are generated through various signal processing and outputted as output signals of the image capture unit 17.

Such output signals of the image capture unit 17 are hereinafter called "captured image data". The captured image data is supplied to the CPU 11, the image processing unit 14, and the like as appropriate.

The input unit 18 is configured by various buttons and the like, and inputs various information in accordance with a user's operations.

The output unit 19 is configured by a display, a speaker, and the like and outputs images and sounds.

The storage unit 20 is configured by a hard disk, DRAM (Dynamic Random Access Memory), or the like, and stores various image data.

The communication unit 21 controls communications with other devices (not illustrated) via networks including the Internet.

A removable media 31 made from a magnetic disk, optical disk, magneto-optical disk, semiconductor memory, or the like is installed in the drive 22 as appropriate. The programs read from the removable media 31 by the drive 22 are installed in the storage unit 20 as necessary. In addition, similarly to the storage unit 20, the removable media 31 can also store various data such as the image data stored in the storage unit 20.

Figure 2:
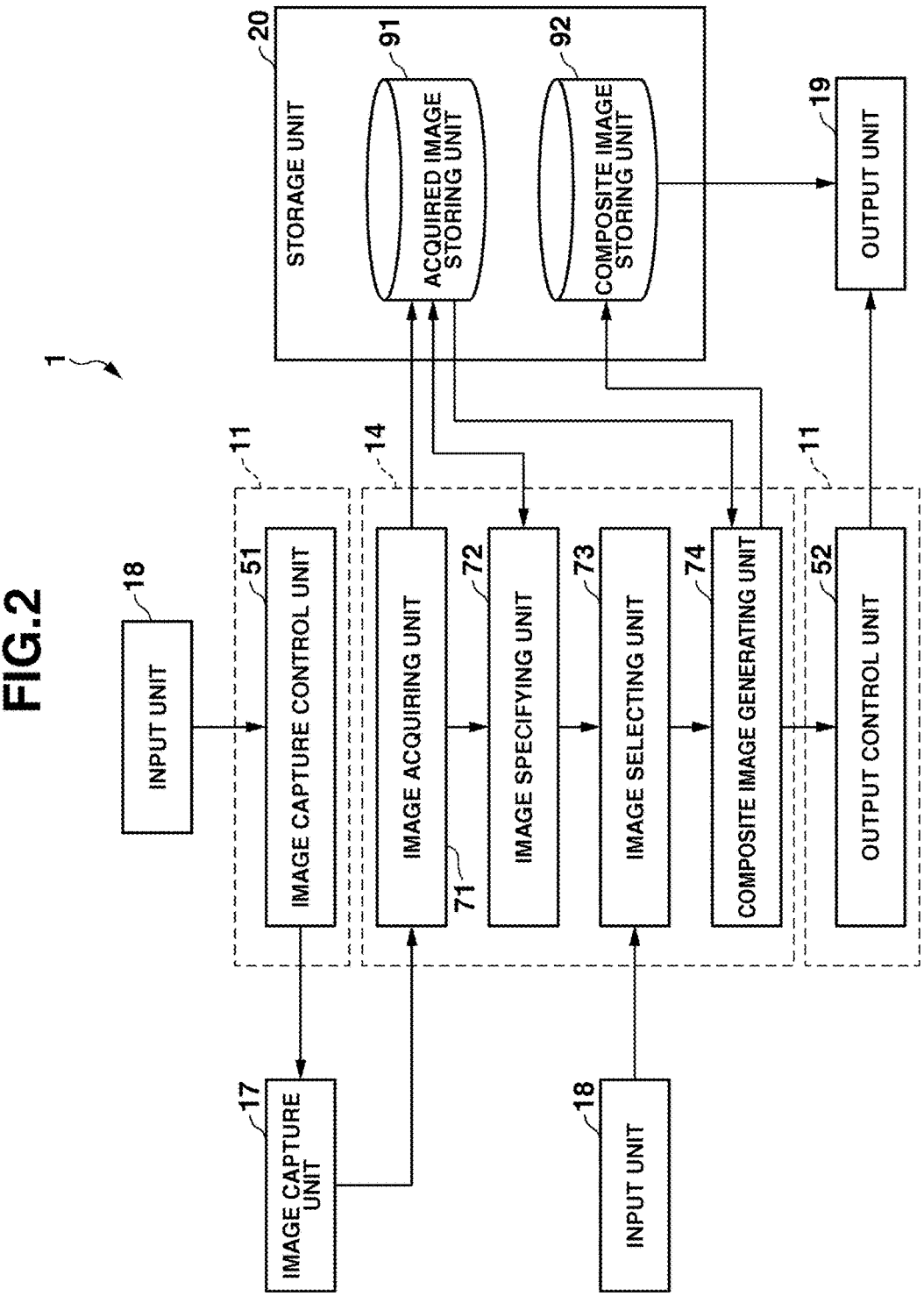
FIG. 2 is a functional block diagram illustrating a functional configuration for executing composite image generating processing among the functional configurations of the image capture device of FIG. 1.

FIG. 2 is a functional block diagram illustrating a functional configuration for executing composite image generating processing among the functional configurations of the image capture device of FIG. 1.

The composite image generating processing refers to a sequence of processing of analyzing a moving image based on data of the moving images acquired, specifying an action of an object captured in the moving image, combining static images corresponding to the action thus specified (a complete composite image or a partial composite image as described later) to display, etc.

In the present embodiment, an example is described in which the image capture device 1 captures a target performing a golf swing as an object.

It should be noted that, in the present embodiment, actions of the object captured is specified as a sequence of actions (hereinafter, referred to as "entire action") as well as partial series of actions that constitute a part of the sequence of actions (hereinafter, referred to as "partial action").

In other words, in the present embodiment that captures a golf swing and generates a composite image, the entire action corresponds to a sequence of actions of a swing and partial actions correspond to each action constituting a swing (for example, address, backswing, top, downswing, impact, follow-through, and finish).

In a case of the composite image generating processing being executed, as shown in FIG. 2, an image capture control unit 51 and an output control unit 52 function in the CPU 11, and an image acquiring unit 71, an image specifying unit 72, an image selecting unit 73, and a composite image generating unit 74 function in the image processing unit 14.

However, FIG. 2 is merely an example, and at least a part of the functions of the CPU 11 may be transferred to the image processing unit 14, or conversely, at least a part of the functions of the image processing unit 14 may be transferred to the CPU 11.

In this case, an acquired image storing unit 91 that is provided as an area of the storage unit 20 and a composite image storing unit 92 are used.

In the acquired image storing unit 91, captured image data outputted from the image capture unit 17 and acquired by the image acquiring unit 71 is stored.

In the composite image storing unit 92, composite image data outputted from the composite image generating unit 74 is stored.

The image capture control unit 51 sets various image capture conditions and controls an operation of image capturing at the image capture unit 17.

In the present embodiment, the image capture control unit 51 causes the image capture unit 17 to capture a moving image in order to capture an action of an object.

The output control unit 52 controls the output unit 19 so as to output to display the composite image (a complete composite image or a partial composite image as described later) stored in the composite image storing unit 92.

The image acquiring unit 71 acquires data of a moving image outputted from the image capture unit 17 as data acquirable as a plurality of single images (static images) that is data of a plurality of images showing a sequence of actions. Then, the image acquiring unit 71 stores data of the moving image acquired in the acquired image storing unit 91.

The image specifying unit 72 performs image specifying to specify an action of an object captured in single images. Furthermore, the image specifying unit 72 associates the action thus specified with a single image. More specifically, the image specifying unit 72 acquires data of the moving image from the acquired image storing unit 91 and specifies an action of the object captured in the single images constituting the moving image. Then, the image specifying unit 72 associates an action of the object thus specified with a corresponding single image, and stores in the acquired image storing unit 91. In the present embodiment, the image specifying unit 72 specifies the actions of a swing forming an entire action and the actions constituting a swing (for example, address, backswing, top, downswing, impact, follow through, and finish) from an action of a human and an action of a club (specifically, an action of a club head).

Regarding a method for specifying a partial action belonging to an action of an object, it is not particularly limited, and for example, a method of specifying a partial action by estimating the partial action based on a swing time may be used, or a method of an image matching technology which specifies a partial action by comparison with a reference image may be used. Furthermore, a method of extracting data of a club or a club head from an image and specifying a partial action of a swing from the positional relationship of the club or the club head thus extracted may be used.

Regarding methods of specifying partial actions belonging to an action of such an object, any publicly known or other methods in the future, for example, the methods disclosed in Japanese Unexamined Patent Application, Publication No. 2008-278386, Japanese Unexamined Patent Application, Publication No. 2009-53786, and Japanese Patent No. 4415198, for example, may be employed.

The image selecting unit 73 selects a plurality of single images specified based on an instruction of image combination from the input unit 18. More specifically, the image selecting unit 73 selects single image data, which corresponds to a designated action, constituting a moving image stored in the acquired image storing unit 91, based on an instruction of combination of a complete composite image or a partial composite image as described later from the input unit 18.

The composite image generating unit 74 combines single images selected by the image selecting unit 73 and generates composite image data.

In a case of single images corresponding to a sequence of actions of a swing being selected as an entire action by the image selecting unit 73, the composite image generating unit 74 generates data of an image made by combining single images capturing a swing to form a single static image (hereinafter, referred to as "complete composite image").

Furthermore, in a case of single images corresponding to a partial action of a swing (for example, a downswing) being selected by the image selecting unit 73, the composite image generating unit 74 generates data of an image made by combining single images capturing the downswing to form a single static image (hereinafter, referred to as "partial composite image"). It should be noted that, in the present embodiment, a partial composite image is combined to include single images corresponding to a partial action and single images corresponding to locations that are temporally before and after the partial action. In other words, in a case of generating data of a partial composite image of the partial action of the downswing, single images in which an action before and after the downswing (an action during top and downswing and an action during downswing and impact) are captured are combined.

Furthermore, upon generating a partial composite image, the composite image generating unit 74 can combine only a main portion of an action (for example, a club head or ball). In other words, in order to clearly show a trajectory of an action on an image that best represents an action selected, the composite image generating unit 74 can combine a part having a movement into the images before and after the image best representing the action selected.

By combining the data of the partial composite image in this way, it is possible to provide a clear image in which an action of an object can be easily recognized.

That is to say, the composite image generating unit 74 generates data of a complete composite image based on an instruction of combination of a complete composite image, and generates data of a partial composite image based on an instruction of combination of a partial composite image by designating a predetermined action by the input unit 18.

Next, an example of the complete composite image generated by the composite image generating processing is explained with reference to FIG. 3.

Figure 3:
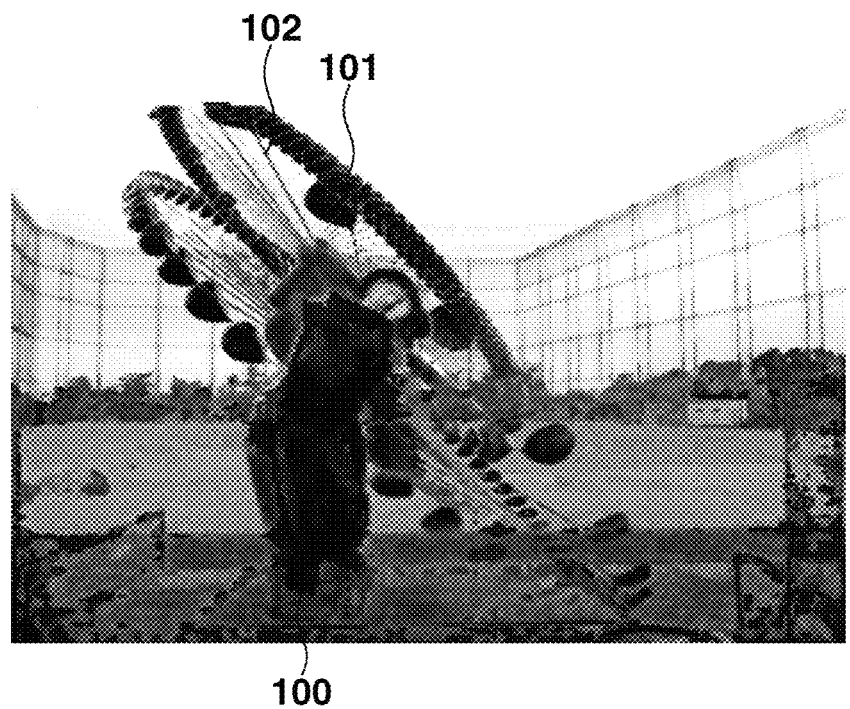
FIG. 3 is a schematic view illustrating an example of a complete composite image generated by the composite image generating processing.

FIG. 3 is a schematic view illustrating an example of a complete composite image generated by the composite image generating processing.

In the example of FIG. 3, data of an entire image is generated from data of a moving image captured from behind a subject that is swinging.

Since the complete composite image is composed of images in which all of actions corresponding to a sequence of actions of a swing are captured, it is formed to be such an image in which partial actions constituting a swing are captured like residual images. In other words, in the present embodiment, the complete composite image is an image in which all of the objects having an action (a swinging subject 100, a club head 101, a club including a club shaft 102, etc.) are combined.

In a case of a golf swing, actions (a trajectory) of a club from the address to the backswing and actions (a trajectory) of a club from the top to the impact through the downswing during the actions from the top to the finish are substantially the same.

Furthermore, in a case of capturing a subject that is swinging from behind, a trajectory from the address to the impact and a trajectory from the impact to the finish are substantially the same.

Therefore, although a user checking a complete composite image can know the actions of an entire swing, it is difficult to know what portion of the entire swing the partial actions respectively correspond to.

Therefore, the image capture device 1 of the present embodiment picks up partial actions only as partial composite images and generates an image that can be displayed.

Next, an example of a partial composite image generated by the composite image generating processing is explained with reference to FIGS. 4A to 4F.

FIGS. 4A to 4F are a schematic view illustrating an example of a partial composite image generated by the composite image generating processing.

FIGS. 4A to 4C are schematic views illustrating an example of a partial composite image corresponding to the downswing, impact, and follow-through in a case of capturing actions of a swing from behind the swinging subject 100.

Regarding the examples of FIGS. 4A to 4C, as compared to the example of FIG. 3 in which the actions of the swing changes in a depth direction of the image, the movement can be easily recognized since the actions of the swing changes in a planar direction with respect to the swinging subject 100.

Furthermore, the examples of FIGS. 4A to 4C are combined to include actions before and after a designated action, and are combined to mainly include the club head 101 and a ball 103 only. In other words, for the swinging subject 100, only a designated action (for example, an action of the impact for FIG. 4B) is combined. By combining in this way, it is possible to easily recognize the partial action that is designated while also enabling a sequence of the partial actions to be recognized.

By combining the partial actions only in this way, a formed image does not become cumbersome even in a case of actions of drawing overlapping trajectories.

Furthermore, FIGS. 4D to 4F are schematic views illustrating an example of a partial composite image corresponding to the downswing, impact, and follow-through in a case of capturing actions of a swing from a front side of the swinging subject 100.

The examples of FIGS. 4D to 4F are formed by combining partial actions corresponding to FIGS. 4A to 4C as partial composite images.

It should be noted that the movements of the club head 101 and the ball 103 are mainly focused in the examples of FIGS. 4D to 4F and it is configured such that a trajectory other than those of the club head 101 and the ball 103 are displayed the least. In other words, in the example of FIGS. 4D to 4F, for the swinging subject 100, the club shaft 102, and the like, only one predetermined partial action is configured to be displayed with maximum clarity, and, for the club head 101 and the ball 103, all of the partial actions are configured to be displayed. In other words, in a case of a predetermined action being selected, the swinging subject 100, the club shaft 102, and the like that are captured in one image constituting the predetermined action are employed, and, for the club head 101, the ball 103, and the like, an image in which all of predetermined actions are captured is employed. In other words, an image is generated in which the swinging subject 100, the club shaft 102, and its background do not move and the club head 101, the ball 103, and the like move since a plurality of images are combined.

Various publicly known methods can be employed for a specific method here. For example, it is possible to extract the swinging subject 100, the club (the club head 101 and club shaft 102), and the ball 103 as objects in the image, adopt only the swinging subject 100 and the club shaft 102 from one image, and adopt the club head 101, the ball 103, and the like from an image of a predetermined action range.

Furthermore, although single images are combined with equal intervals in the example of FIGS. 4D to 4F, the present invention is not limited thereto, and intervals of the images upon combining may be changed depending on an action speed or in accordance with a designated part.

Next, an example of switching a display from a complete composite image to a partial composite image is explained with reference to FIG. 5.

Figure 5:
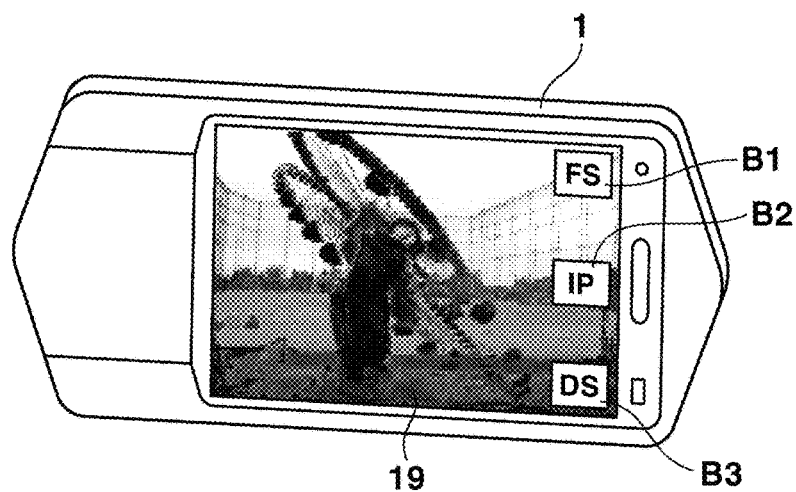
FIG. 5 is a view illustrating an example of a selection screen of a partial composite image displayed on a output unit of the image capture device.

FIG. 5 is a view illustrating an example of a selection screen of a partial composite image displayed on the output unit 19 of the image capture device. In the image capture device 1 of the present embodiment, software buttons B1 to B3 by which a partial image as shown in FIG. 5 can be selected appear after displaying a complete composite image. Upon selecting either of the software buttons B1 to B3, a partial composite image corresponding to the software buttons B1 to B3 thus selected can be generated and displayed.

In the example of FIG. 5, the software buttons (a "FS" button, an "IP" button, and a "DS" button) are displayed on the complete composite image. By a user selecting either of the software buttons by performing a touch operation thereon or operating the input unit 18, the image capture device 1 generates and displays a partial composite image corresponding to a software button selected.

It should be noted that the "FS" button is a software button for generating a partial composite image corresponding to an action of the follow-through and instructing to display it. The "IP" button is a software button for generating a partial composite image corresponding to an action of the impact and instructing to display it. The "DS" button is a software button for generating a partial composite image corresponding to an action of the downswing and instructing to display it.

A partial image of a corresponding action may be generated by touching or selecting an object.

Next, composite image generating processing executed by the image capture device 1 of FIG. 1 having the functional configurations of FIG. 2 is explained with reference to the flowchart of FIG. 6. It should be noted that, in the present example, an example is explained in which data of a complete composite image is generated and, after displaying it, data of the partial composite image of the follow-through is generated and displayed.

Figure 6:
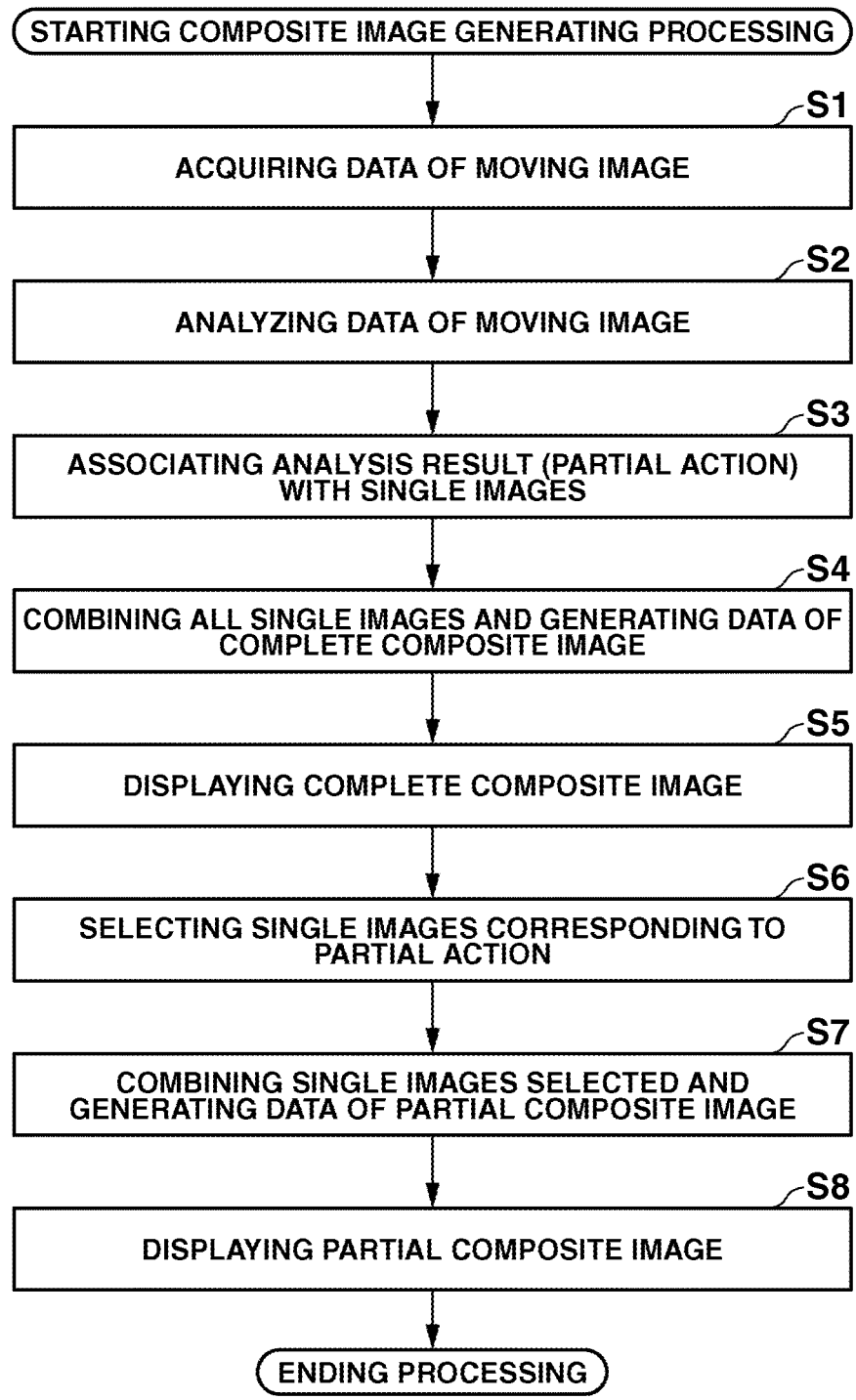
FIG. 6 is a flowchart illustrating a flow of composite image generating processing executed by the image capture device of FIG. 3 having the functional configuration of FIG. 2.

FIG. 6 is a flowchart illustrating an example of a flow of the composite image generating processing executed by the image capture device of FIG. 1 having the functional configurations of FIG. 2.

When a start of the composite image generating processing is instructed by a predetermined operation by the user on the input unit 18, the composite image generating processing starts and executes the following processing.

In Step S1, the image acquiring unit 71 acquires data of a moving image as data of a plurality of images showing a sequence of actions. More specifically, upon receiving an input for the start of image capture from the input unit 18, the image capture control unit 51 starts capturing at the image capture unit 17. Then, the image acquiring unit 71 acquires data of the moving image captured by the image capture unit 17. Furthermore, the image acquiring unit 71 stores data of the moving image thus acquired in the acquired image storing unit 91.

In Step S2, the image specifying unit 72 analyzes data of the moving image. In other words, the image specifying unit 72 analyzes data of single images constituting the data of the moving image. The analysis of the data of the single images is performed by specifying an action of an object captured in the single images.

More specifically, the image specifying unit 72 specifies that an action of an object captured in single images constituting a moving image belongs to the downswing, for example.

In Step S3, the image specifying unit 72 associates the single images with a specifying result.

More specifically, the image specifying unit 72 stores data indicating a partial action specified in Step S2 with data of the single images to be associated in the acquired image storing unit 91.

In Step S4, the composite image generating unit 74 combines all of the single images and generates data of a complete composite image. More specifically, all of the single images are selected by the image selecting unit 73, and the composite image generating unit 74 combines all of the single images thus selected into one static image and generates data of the complete composite image.

In Step S5, the output unit 19 displays the complete composite image. More specifically, the output unit 19 controls so as to output and display the complete composite image by the output control unit 52. As a result thereof, the complete composite image in which all of the single images constituting the moving image as shown in FIG. 3 is displayed at the output unit 19.

In Step S6, the image selecting unit 73 selects data of the single images corresponding to a partial action designated. More specifically, in a case in which a partial action is designated as shown in FIG. 5 by the user operating the input unit 18, the image selecting unit 73 selects the data of the single images corresponding to the partial action thus designated that is stored in the acquired image storing unit 91, from the acquired image storing unit 91 to be stored.

During this, in the example shown in FIG. 5, the software button B1 of "FS" is touched and the single images corresponding to the follow-through corresponding to the software button B1 of "FS".

In Step S7, the composite image generating unit 74 combines the single images thus selected and generates data of the complete composite image. More specifically, all of the single images are selected by the image selecting unit 73, and the composite image generating unit 74 combines all of the single images thus selected and generates data of the complete composite image.

The composite image generating unit 74 acquires the single images corresponding to the follow-through thus selected from the acquired image storing unit 91, combines all of the single images corresponding to the follow-through, and generates data of a partial composite image corresponding to a partial action of the follow through.

During this, although all of the single images corresponding to the follow-through designated are acquired, single images corresponding to partial actions before and after the follow-through are further acquired.

In Step S8, the output unit 19 displays the partial composite image. More specifically, the output unit 19 controls so as to output to display the partial composite image by the output control unit 52. As a result thereof, the partial composite image in which the single images corresponding to the action of the follow-through, as shown in FIG. 4C, is displayed at the output unit 19.

Furthermore, in Step S6, by changing a designation of the partial action, for example, by the software button B2 of "IP" being touched, a partial composite image corresponding to an action of the impact as shown in FIG. 4B is displayed.

By capturing an object from the front side thereof, it is possible to generate and display a partial composite image of an action corresponding to the downswing as shown in FIG. 4D, a partial composite image of an action corresponding to the impact as shown in FIG. 4E, a partial composite image of an action corresponding to the follow-through as shown in FIG. 4F, etc., for example.

In this way, the composite image generating processing ends after displaying the partial composite image in the processing of Step S8.

The image capture device 1 executing the above such composite image generating processing includes the image acquiring unit 71, the image specifying unit 72, the image selecting unit 73, and the composite image generating unit 74.

The image acquiring unit 71 acquires data of a plurality of images showing an action of an object.

The image specifying unit 72 specifies a partial action constituting the actions of an object from a plurality of images acquired by the image acquiring unit 71.

The image selecting unit 73 selects data of an image corresponding to a predetermined partial action from among the data of the plurality of images based on a specifying result by the image specifying unit 72.

The composite image generating unit 74 generates one composite image from the data of a plurality of images selected by the image selecting unit 73.

Therefore, in the image capture device 1, one composite image is generated from the data of an image corresponding to a predetermined partial action from among the data of a plurality of images selected based on a specifying result by the image specifying unit 72.

Therefore, in the image capture device 1, it is possible to generate an image in which a specified partial action in an action of an object can be easily recognized. Furthermore, since the image generated only includes a specified partial action, the image does not become unrecognizable.

Furthermore, the image selecting unit 73 selects data of images corresponding to at least either of an action before or after a predetermined partial action, in addition to the data of images corresponding to the predetermined partial action.

Therefore, in the image capture device 1, since an image is combined by simply including the action before or after the parts corresponding to a predetermined partial action, the image includes the data of a trajectory to reach a predetermined partial action, a trajectory following a trajectory of a predetermined part, and the like, it is possible to easily understand a trajectory of a partial action.

It is to be noted that the present invention is not limited to the above-described embodiment and modifications, improvements, and the like, that fall within the range in which the object of the present invention can be achieved are included in the present invention.

In the abovementioned embodiment, although the image acquiring unit 71 acquires a plurality of images including actions of an object captured by the image capture device 1, the present invention is not limited thereto. So long as the data of images acquired is a plurality of data including a sequence of actions, for example, not limited to a moving image, it may be a static image, or may be an image acquired externally that is not captured by the image capture unit.

Furthermore, in the abovementioned embodiment, although the composite image (the complete composite image or the partial composite image) is combined regardless of an action speed, the present invention is not limited thereto. For example, in a composite image, it may be configured such that images are thinned out and composite for a slow part of an action, and captured images are interpolated for a fast part of an action. With such a configuration, it is possible to provide an image in which the trajectory of a partial action can be easily recognized.

Although the present invention is described using, as an example, a golf swing as a sequence of actions in the above-described embodiment, the present invention is not limited thereto. For example, although an action including a repetitive movement is preferable as a sequence of actions, the present invention is not limited thereto, not limited to actions in sports such as ball games such as baseball and tennis, or martial sports such as Kendo, and Judo, and not limited to a sequence of regularly defined actions. It is acceptable so long as being a composite image in which a partial action for which easy recognition has been facilitated and the image itself has not been made unrecognizable, by extracting a partial action of a sequence of actions.

Although in the above-described embodiment the imaging apparatus 1 to which the present invention is applied is described using, as an example, a digital camera, the present invention is not particularly limited thereto.

For example, the present invention can be applied to electronic equipment in general having a composite image generation function. Specifically, for example, the present invention can be applied to notebook personal computers, printers, television receivers, video cameras, portable navigation apparatuses, mobile phones, portable game machines, etc.

The above-described series of processes can be performed by hardware or can be performed by software.

In other words, the functional configurations shown in FIG. 2 are merely illustrative and thus are not particularly limited. Namely, it is sufficient that the imaging apparatus 1 have a function capable of performing the above-described series of processes as a whole, and what functional blocks are used to implement the function are not particularly limited to the examples in FIG. 2.

A single functional block may be configured by hardware alone or may be configured by software alone or may be configured by a combination thereof.

When a series of processes are performed by software, a program constituting the software is installed on a computer, etc., via a network or from a recording medium.

The computer may be a computer incorporated in dedicated hardware. Alternatively, the computer may be a computer capable of performing various functions by installing various programs, e.g., a general-purpose personal computer.

A recording medium including such a program is not only configured by the removable media 31 in FIG. 1 which is distributed separately from the apparatus main body in order to provide a user with the program, but is also configured by, for example, a recording medium which is provided to the user, incorporated in advance in the apparatus main body. The removable media 31 is configured by, for example, a magnetic disk (including a floppy disk), an optical disk, a magneto-optical disk, or the like. The optical disk may be configured by, for example, a CD-ROM (Compact Disk-Read Only Memory), a DVD (Digital Versatile Disk), or the like. The magneto-optical disk is configured by an MD (Mini-Disk) or the like. The recording medium which is provided to the user, incorporated in advance in the apparatus main body is configured by, for example, the ROM 12 in FIG. 1 having a program recorded therein, a hard disk included in the storage unit 20 in FIG. 1, or the like.

Note that in the specification the steps describing a program recorded in a recording medium not only include processes that are performed in the order of the steps in a time-series manner, but also include processes that are not necessarily processed in a time-series manner but are performed in parallel or individually.

Although the embodiment of the present invention has been described above, the embodiment is merely illustrative and do not limit the technical scope of the present invention. The present invention can employ various other embodiments, and furthermore, various changes such as omission and replacement may be made therein without departing from the true spirit of the present invention. These embodiments and modifications thereto are included in the true scope and spirit of the present invention described in the specification, etc., and are included in the inventions described in the appended claims and in the range of equivalency of the inventions.

What is claimed is:

1. An image processing device comprising a CPU which functions as units comprising:
    an image acquiring unit that acquires a plurality of images indicative of a sequence of actions of a subject;
    a selecting unit that selects, in accordance with an operation by a user, a specific kind of partial action from among a plurality of kinds of partial actions included in the sequence of actions of the subject;
    an image selecting unit that selects a plurality of images corresponding to the specific kind of partial action selected by the selecting unit from among the plurality of images acquired by the image acquiring unit; and
    an image composition unit that generates a composite image by superposing the plurality of images selected by the image selecting unit,
    wherein the CPU further functions as:
        a display control unit that performs control to display, on a display, a plurality of predetermined areas respectively corresponding to the plurality of kinds of partial actions included in the sequence of actions of the subject, and
    wherein the selecting unit selects, in accordance with the operation by the user by which one of the plurality of predetermined areas is specified, the specific kind of partial action from among the plurality of kinds of partial actions included in the sequence of actions of the subject, the specific kind of partial action corresponding to the specified one of the predetermined areas.

2. The image processing device according to claim 1, wherein the image selecting unit selects images corresponding to at least one of an action before and an action after the specific kind of partial action, in addition to images corresponding to the specific kind of partial action.

3. The image processing device according to claim 1, wherein the image acquiring unit acquires images in which a golf swing performed by the subject is captured as the sequence of actions of the subject.

4. The image processing device according to claim 1, wherein each of the plurality of kinds of partial actions has a corresponding action period in which it is performed, the action periods being different between the plurality of kinds of partial actions.

5. The image processing device according to claim 1, wherein the selecting unit selects at least one action from among an address, a backswing, a top, a downswing, an impact, a follow-through, and a finish as the specific kind of partial action, when the sequence of actions of the subject comprises a swing action performed by the subject.

6. The image processing device according to claim 1, wherein the display includes a touch panel, and
    wherein the selecting unit selects the specific kind of partial action in accordance with a touch operation received at a respective one of the plurality of predetermined areas displayed on the display.

7. An image processing method executed by an image processing device, the method comprising:
    acquiring a plurality of images indicative of a sequence of actions of a subject;
    selecting, in accordance with an operation by a user, a specific kind of partial action from among a plurality of kinds of partial actions included in the sequence of actions of the subject;
    selecting a plurality of images corresponding to the specific kind of partial action from among the acquired plurality of images;
    generating a composite image by superposing the plurality of images selected in the selecting;
    performing control to display, on a display, a plurality of predetermined areas respectively corresponding to the plurality of kinds of partial actions included in the sequence of actions of the subject,
    wherein the selecting comprises selecting, in accordance with the operation by the user by which one of the plurality of predetermined areas is specified, the specific kind of partial action from among the plurality of kinds of partial actions included in the sequence of actions of the subject, the specific kind of partial action corresponding to the specified one of the predetermined areas.

8. A non-transitory computer-readable storage medium having a program stored thereon, the program being executable to control a computer to function as units comprising:
    an image acquiring unit that acquires a plurality of images indicative of a sequence of actions of a subject;
    a selecting unit that selects, in accordance with an operation by a user, a specific kind of partial action from among a plurality of kinds of partial actions included in the sequence of actions of the subject;

an image selecting unit that selects a plurality of images corresponding to the specific kind of partial action selected by the selecting unit from among the plurality of images acquired by the image acquiring unit;

an image composition unit that generates a composite image by superposing the plurality of images selected by the image selecting unit; and a display control unit that performs control to display, on a display, a plurality of predetermined areas respectively corresponding to the plurality of kinds of partial actions included in the sequence of actions of the subject, and wherein the selecting unit selects, in accordance with the operation by the user by which one of the plurality of predetermined areas is specified, the specific kind of partial action from among the plurality of kinds of partial actions included in the sequence of actions of the subject, the specific kind of partial action corresponding to the specified one of the predetermined areas.

9. The image processing device according to claim 1, wherein the composite image generated by the image composition unit is a static image.

10. The image processing method according to claim 7, wherein the generated composite image is a static image.

11. The non-transitory computer-readable storage medium according to claim 8, wherein the composite image generated by the image composition unit is a static image.

* * * * *